(12) United States Patent
Yang et al.

(10) Patent No.: US 8,761,140 B2
(45) Date of Patent: Jun. 24, 2014

(54) METHOD OF HANDLING OWNERSHIP TRANSFER AND RELATED COMMUNICATION

(75) Inventors: Ju-Ting Yang, Taoyuan County (TW); Yin-Yeh Tseng, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 125 days.

(21) Appl. No.: 13/361,970

(22) Filed: Jan. 31, 2012

(65) Prior Publication Data

US 2012/0201233 A1 Aug. 9, 2012

Related U.S. Application Data

(60) Provisional application No. 61/440,405, filed on Feb. 8, 2011.

(30) Foreign Application Priority Data

Jul. 29, 2011 (TW) .............................. 100126991 A

(51) Int. Cl.
*H04W 4/00* (2009.01)
(52) U.S. Cl.
USPC .......................................... 370/338; 370/401
(58) Field of Classification Search
USPC .................................. 370/338, 401
See application file for complete search history.

(56) References Cited

U.S. PATENT DOCUMENTS

2008/0220765 A1\* 9/2008 Chu et al. ................... 455/422.1
2010/0312897 A1 12/2010 Allen

FOREIGN PATENT DOCUMENTS

EP 2 166 790 A1 3/2010

OTHER PUBLICATIONS

Yang et al., "Service Group Owner Change Notification", Service_Group_Owner_Change_Notification, Change Request, Open Mobile Alliance Ltd., Apr. 13, 2011.
Yang et al., "Service Group Owner Change Notification", Service_Group_Owner_Change_Notification, Change Request, Open Mobile Alliance Ltd., Feb. 1, 2011.
"Converged Personal Network Service Core Technical Specification", Open Mobile Alliance Ltd., Apr. 15, 2011.
"Converged Personal Network Service Requirements", Open Mobile Alliance Ltd., Nov. 17, 2009.
"Converged Personal Network Service Core Technical Specification", Open Mobile Alliance Ltd., Jan. 18, 2011.
Office action mailed on Oct. 23, 2013 for the Taiwan application No. 100126991, filing date Jul. 29, 2011, p. 1-9.

\* cited by examiner

*Primary Examiner* — Sai-Ming Chan
(74) *Attorney, Agent, or Firm* — Winston Hsu; Scott Margo

(57) ABSTRACT

A method of handling ownership transfer in owner transfer procedure in a wireless communication system is disclosed. The wireless communication system includes a server, at least one personal network gateway and at least one personal network entity. The method includes sending an owner change notification message from the server to the at least one personal network gateway, and sending the owner change notification message from the at least one personal network gateway to the at least one personal network entity; wherein the owner change notification message comprises a service group owner element and a service group identification element; wherein the service group owner element indicates a personal network entity identification of a personal network entity having an ownership.

16 Claims, 5 Drawing Sheets

US 8,761,140 B2

METHOD OF HANDLING OWNERSHIP TRANSFER AND RELATED COMMUNICATION

CROSS REFERENCE TO RELATED APPLICATIONS

This application claims the benefit of U.S. Provisional Application No. 61/440,405 filed on Feb. 8, 2011 and entitled "Message Content and Format of Service Group Owner Change Notification in CPNS", the contents of which are incorporated herein by reference.

BACKGROUND OF THE INVENTION

1. Field of the Invention

The present invention relates to a method of handling ownership transfer and related communication device for an open mobile alliance wireless communication system.

2. Description of the Prior Art

Currently, more and more users link electronic products to a personal network (PN) with a small linkage area, e.g. home network, car network and body area network. The personal network further builds the accessibility of the electronic devices and personal network entity (PNE) to connect to other networks, which realize many services, e.g. access service from a personal network entity outside the personal network. For example, a bluetooth-linked personal media player can receive the video stream on the internet through a mobile phone linking to the wide area network (WAN).

Open Mobile Alliance (OMA) is the focal point for the development of mobile service enabler specifications, which support the creation of interoperable end-to-end mobile services. OMA drives service enabler architectures and open enabler interfaces that are independent of the underlying wireless networks and platforms. OMA creates interoperable mobile data service enablers that work across devices, service providers, operators, networks, and geography.

In open mobile alliance (OMA) Converged Personal Network Services (CPNS) specification, converged personal network service (CPNS) server, personal network gateway (PN GW), and PNE(s) (Personal Network Element) constitute the basic architecture of CPNS. CPNS Server is an entity of CPNS enabler that replies to requests from personal network gateway The personal network gateway serves as an intermediary entity between the PNE (s) and other networks that forwards the requests from the PNE(s) to the other networks and the other way around. PNE(s) are connected to the personal network gateway and between each other and are used for rendering the content received from the PN GW or from each other.

In OMA CPNS, a service group (SG) is composed of a CPNS Server, one or more personal network gateways, and also one or more PNE(s). The intention of the service group is to gather together PNE(s) which want to consume the same service from CPNS Server/content provider. That is, for those PNE (s) that want to consume game service can belong to a service group providing the game service, and for those PNE(s) that want to consume music service can belong to a service group providing the music service.

A PNE creating a service group is a service group owner, which behaves as SG leader and manages the service group including inviting new SG member to enter the service group, expelling service group member, deleting a service group. When a service group owner leaves the service group due to low battery life or bad signal intensity; or, when a service group owner stays in the service group, however, it doesn't want to serve as the SG Owner anymore, a service group owner transfer procedure is needed. During the group owner transfer procedure, unsynchronized service group status between CPNS server and group owner will result in defective service group functionalities.

SUMMARY OF THE INVENTION

It is therefore an object of the present invention to provide a method of handling ownership transfer and related communication device.

The invention discloses a method of handling ownership transfer in owner transfer procedure in a wireless communication system including a server, at least one personal network gateway and at least one personal network entity, the method includes sending an owner change notification message from the server to the at least one personal network gateway and sending the owner change notification message from the at least one personal network gateway to the at least one personal network entity.

The invention further discloses a method of ownership transfer for an owner transfer procedure in a wireless communication system, including adding a service group owner element in a service group member change notification message.

The invention further discloses a wireless communication system, comprising at least one personal network entity, at least one personal network gateway, respectively coupled to the at least one personal network entity, for sending a message to the at least one personal network entity, and a server, coupled to the at least one personal network gateway, for sending the owner change notification message to the at least one personal network gateway.

The invention further discloses a communication device, for handling ownership transfer in an owner transfer procedure in a wireless communication system, including a storage entity, for storing a program code corresponding to a processing method, and a processor, coupled to the storage entity, for processing the program code to execute the processing method, wherein the processing method comprises sending or receiving an owner change notification message.

The invention further discloses a communication device, for handling ownership transfer in an owner transfer procedure in a wireless communication system, including a storage entity, for storing a program code corresponding to a processing method, and a processor, coupled to the storage entity, for processing the program code to execute the process method, wherein the processing method comprises adding a service group owner element in a service group member change notification message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
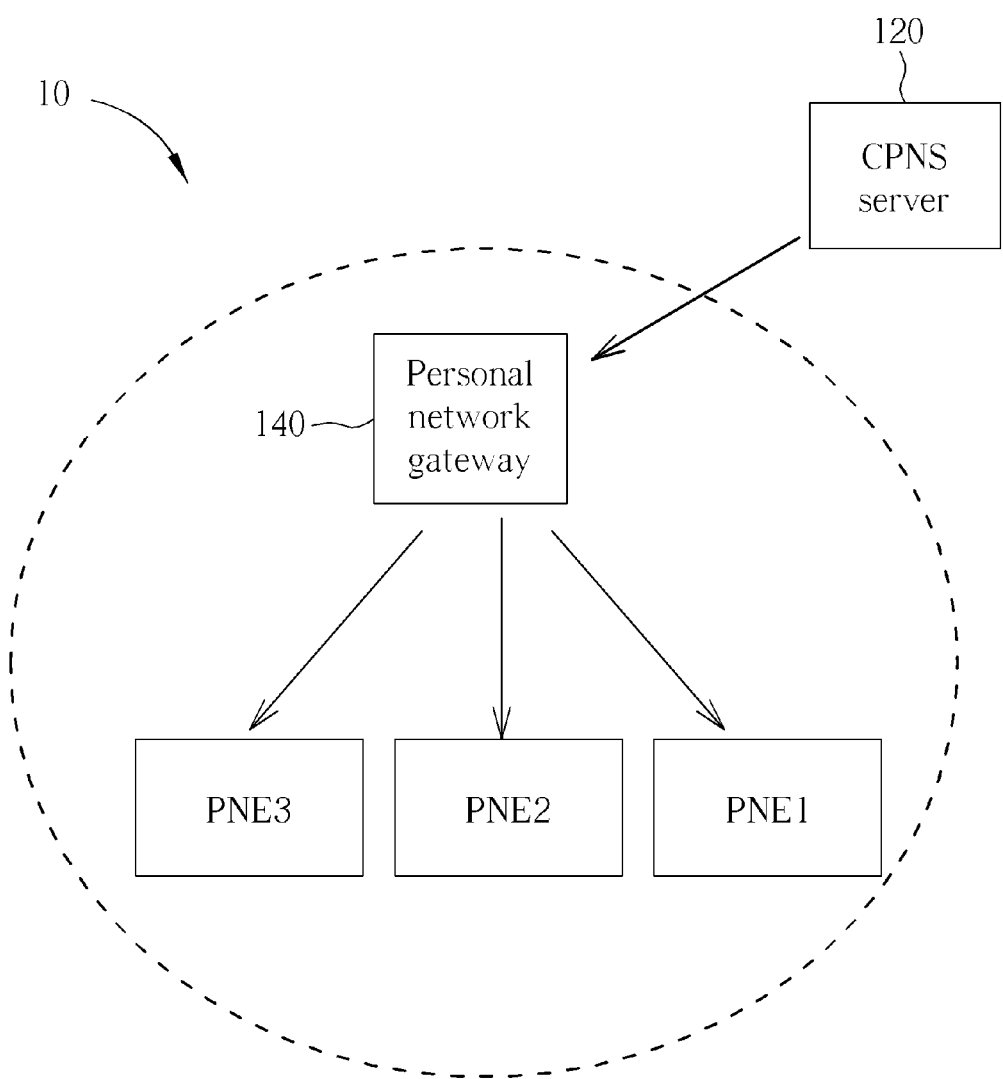
FIG. 1 is a schematic diagram of an exemplary wireless communication system.

Please refer to FIG. 1, which is a schematic diagram of an exemplary wireless communication system 10. The wireless communication system 10 includes a converged personal network service (CPNS) server 120, a personal network gateway 140 and personal network entities (PNE) PNE1, PNE2 and PNE3. For simplicity, there are only three personal network entities shown in FIG. 1. Preferably, the wireless communication system 10 is an open mobile alliance (OMA) wireless communication system. A service group SG may be composed of the CPNS server 120, the personal network gateway 140 and the personal network entities PNE1, PNE2 and PNE3. In the service group SG, the personal network entities PNE1, PNE2 and PNE3 have the same service provided from the CPNS server 120. Preferably, the personal network gateway 140 may be a mobile device or a desktop. The personal network entities PNE1, PNE2 and PNE3 may be a mobile device, a computer, an audio player, a vehicle navigation system or a desktop. In other words, a mobile device may play a role of the personal network entities PNE1, PNE2 and PNE3 or the personal network gateway 140 according to user's requirement.

Figure 2:
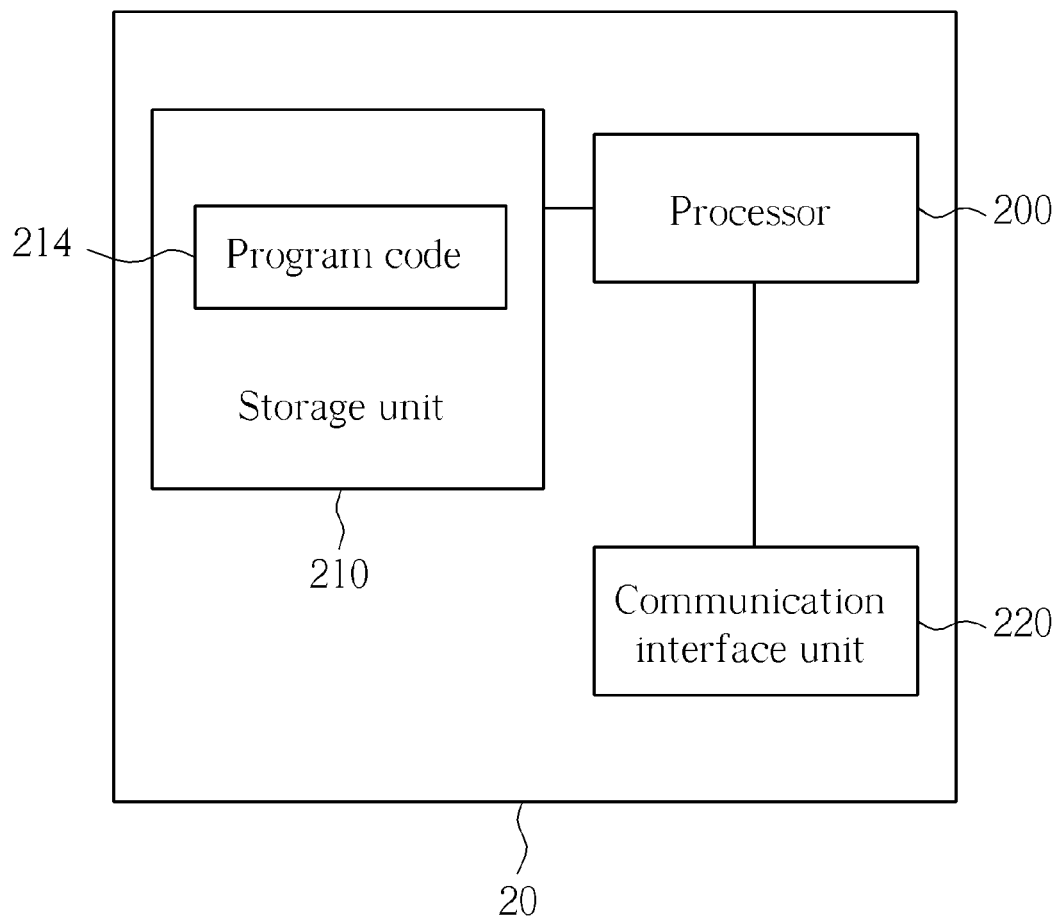
FIG. 2 is a schematic diagram of an exemplary communication device.

Please refer to FIG. 2, which is a schematic diagram of a communication device 20 according to an embodiment of the invention. The communication device 20 may be the CPNS server 120, the personal network gateway 140 or the personal network entities PNE1, PNE2 and PNE3 shown in FIG. 2. The communication device 20 includes a processor 200, such as a microprocessor or an application-specific integrated circuit (ASIC), a storage unit 210 and a communication interface unit 220. The storage unit 210 may be any data storage devices for storing the program code 214 for the processor 200 to access with. For example, the storage unit 210 may be a subscriber identity module (SIM), a read-only memory (ROM), a random-access memory (RAM), CD-ROMs, magnetic tapes, a hard disks or optical data storage devices, and not limited to the mentioned storage devices. The communication interface entity 220 may be a wireless transceiver for exchanging wireless signals with the corresponding communication devices according to the processing result of the processor 200.

The personal network entity PNE1 establishes the service group SG first, and thus the personal network entity PNE1 is a service group owner of the service group SG. The personal network entity PNE1 is able to manage the service group SG, e.g. invite a new member to enter the service group, exclude a member from the service group or delete a member list in the service group. When the personal network entity PNE1 leaves the service group SG for some reasons, such as but not limit to low battery life, bad signal intensity, or the personal network entity PNE1 no longer wants to be the service group owner, an owner transfer procedure is needed to transfer the service group ownership to another personal network entity, e.g. PNE2 or PNE3.

Figure 3:
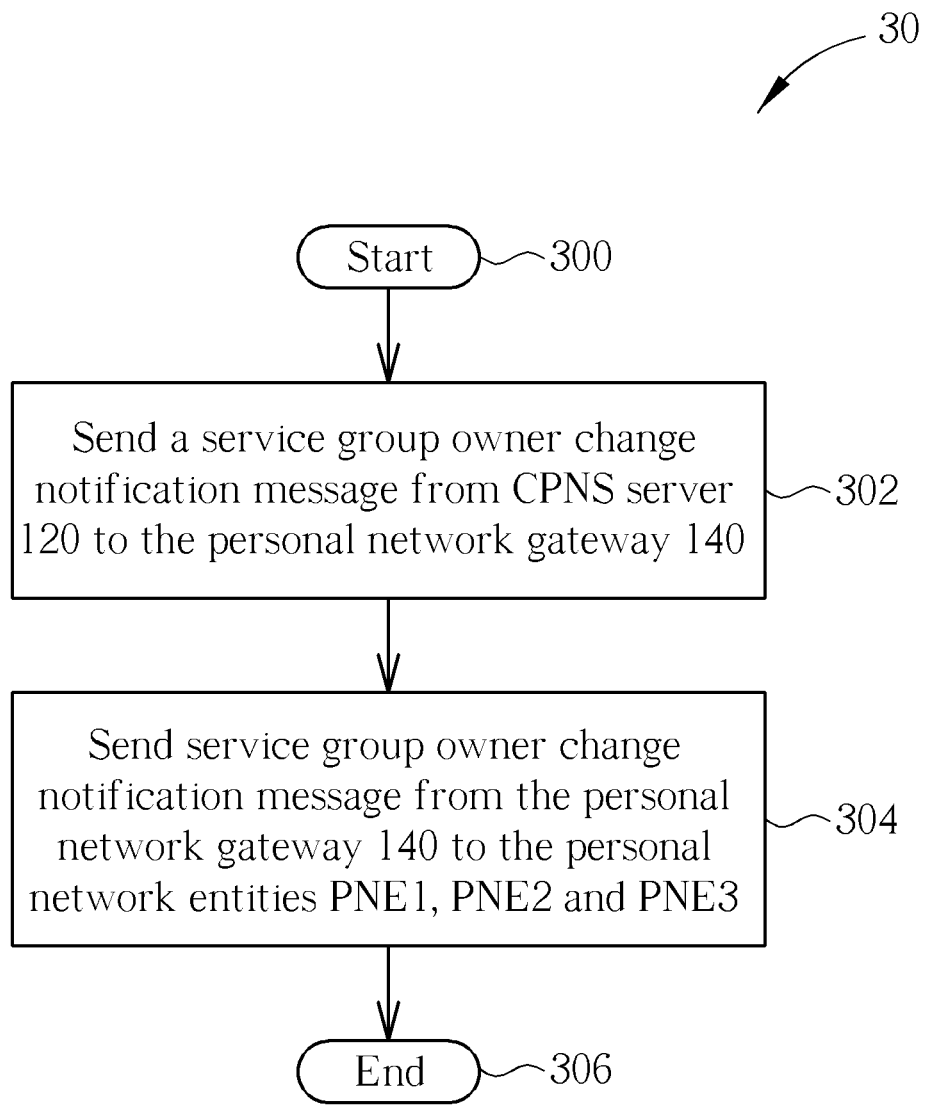
FIG. 3 is a schematic diagram of an exemplary process.

Please refer to FIG. 3, which is a flow chart of an exemplary process 30. The process 30 is used for handling ownership transfer in the owner transfer procedure in the wireless communication system 10. In the service group SG, the service group owner is changed from the personal network entity PNE1 to the personal network entity PNE2. The process 30 can be compiled into the program code 214 and includes the following steps:

Step 300: Start.

Step 302: Send a service group owner change notification message from CPNS server 120 to the personal network gateway 140.

Step 304: Send service group owner change notification message from the personal network gateway 140 to the personal network entities PNE1, PNE2 and PNE3.

Step 306: End.

According to the process 30, the wireless communication system 10 through sending the service group owner change notification message to notify the personal network gateway 140 and the personal network entities PNE1, PNE2 and PNE3 that the service group owner is changed from the personal network entity PNE1 to the personal network entity PNE2. That is, the CPNS server 120 sends the service group owner change notification message to the personal network gateway 140. Then, the personal network gateway 140 sends the service group owner change notification message to the personal network entities PNE1, PNE2 and PNE3. Wherein, the service group owner change notification message includes a service group owner element and a service group identification element. The service group owner element indicates a personal network entity identification of the personal network entity PNE2. The service group identification element indicates a service group identification of personal network entity PNE2. As a result, the service group owner change notification message is transmitted and synchronized in the service group owner information of all personal network entities in the service group SG. Notably, the process 30 is not limited to utilizing in the wireless communication system shown in FIG. 1, the process 30 is suitable for a wireless communication system including a plurality of personal network gateways and a plurality of personal network entities.

Figure 4:
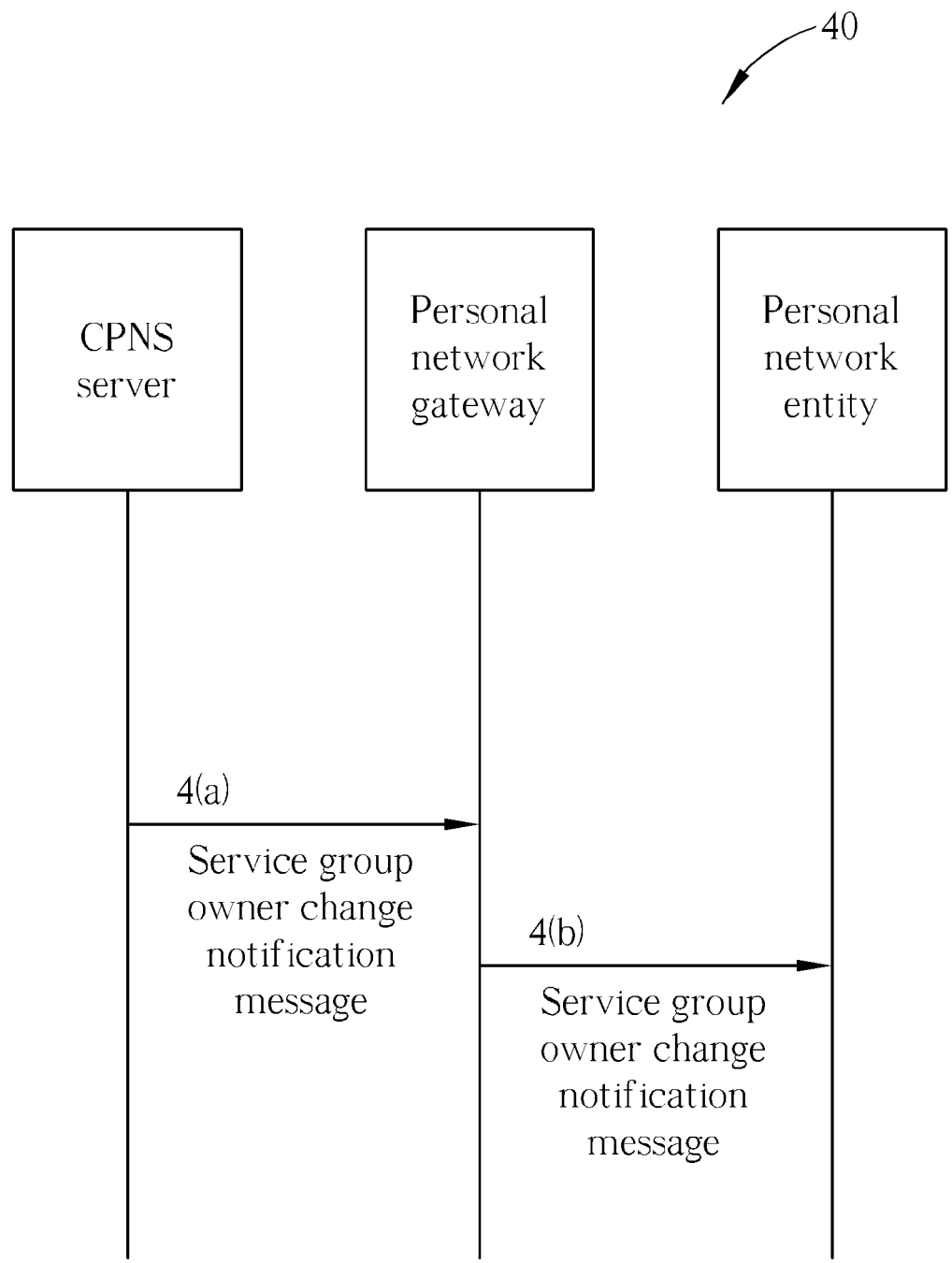
FIG. 4 is an exemplary sequence diagram.

Please refer to FIG. 4, which is an exemplary sequence diagram 40. In the step 4(a), the service group owner change notification message is sent from a CPNS server to a personal network gateway. In the step 4(b), the service group owner change notification message is sent from the personal network gateway to the personal network entity. The sequence diagram 40 may be utilized in the owner transfer procedure to notify the service ownership transfer.

Please refer to chart (1), which illustrates an exemplary service group owner change notification message. The service group owner change notification message includes an element, type, data type and description. The element of the service group owner change notification message includes a service group owner change notification, MSGID, SGOwner, SGID and so on. Cardinality with "1" represents mandatory. Type with "E" represents an element; type with "A" represents attribute. For example, element: SGID; cardinality: "1"; type (T): "A"; data type: string; description: service group identification.

CHART 1

| Element | Cardinality | T | Data Type | Description |
| --- | --- | --- | --- | --- |
| service group owner change notification | 1 | E | | Sub-characteristics MSGID SGOwner SGID |
| MSGID | 1 | A | string | Message ID |
| SGOwner | 1 | A | string | personal network entity identification of the service group owner |
| SGID | 1 | A | string | service group identification |

Figure 5:
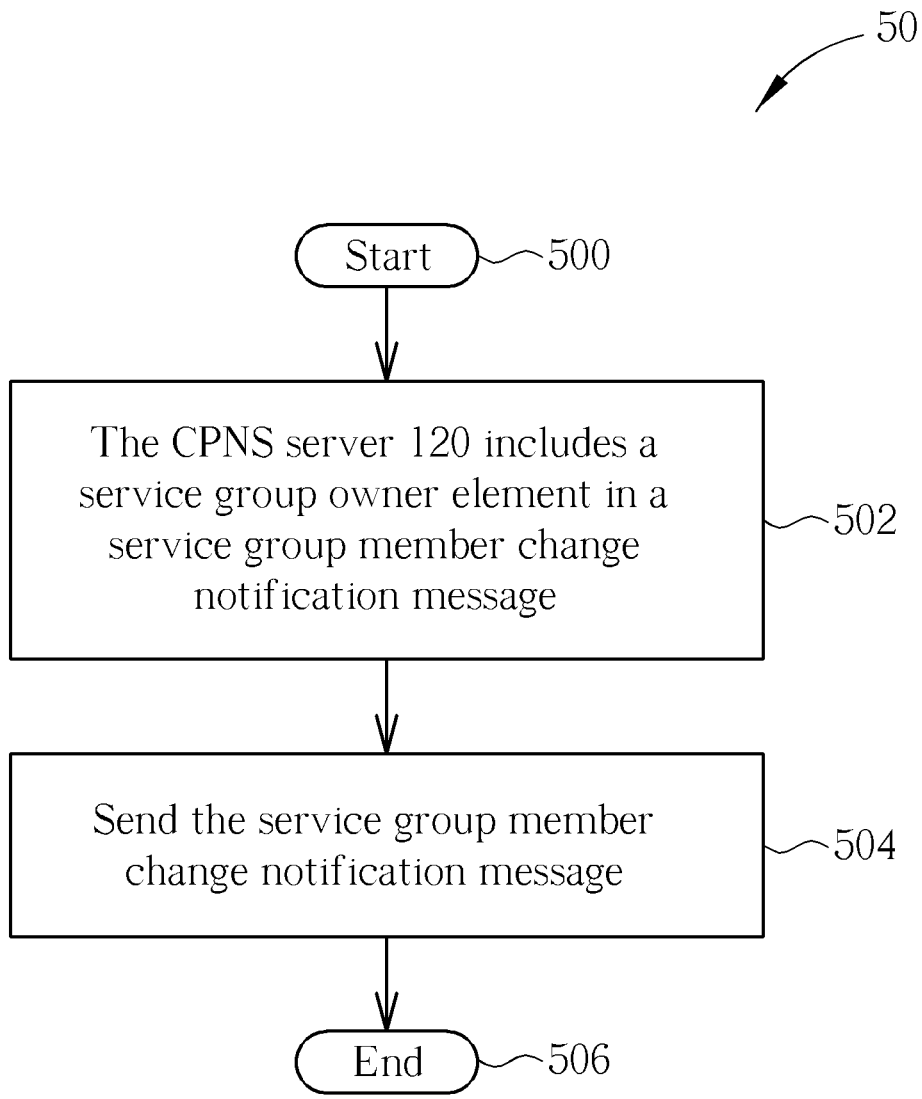
FIG. 5 is a schematic diagram of an exemplary process.

Please refer to FIG. 5, which is a flow chart of an exemplary process 50. The process 50 may be used for handling ownership transfer in the owner change procedure in the wireless communication system. In the service group SG, the service group owner is changed from the personal network entity PNE1 to the personal network entity PNE2. The process 50 can be complied into the program code 214 and includes the following steps:

Step 500: Start.

Step 502: The CPNS server 120 includes a service group owner element in a service group member change notification message.

Step 504: Send the service group member change notification message.

Step 506: End.

Noticeably, between the step 502 and the step 504, may further include the following step: send a service group owner change notification message from the CPNS server 120 to the personal network gateway 140; and send the service group owner change notification message from the personal network gateway 140 to the personal network entities PNE1, PNE2 and PNE3.

According to the process 50, during the owner transfer procedure, the CPNS server 120 includes a service group owner element in a service group member change notification message, and sends the service group member change notification message. The service group owner element indicates the personal network entity identification of the personal network entity PNE2. As a result, by sending the service group member change notification message the wireless communication system 10 notifies the personal network gateway 140 and the personal network entities PNE1, PNE2 and PNE3 that the service group owner is changed from the personal network entity PNE1 to the personal network entity PNE2.

Please refer to chart (2), which illustrates an exemplary form included in a service group member change notification message. In chart (2), element: SGOwner; cardinality: "1"; type (T): "A"; data type: string; description: service group owner of entity identification.

CHART 2

| Element | Cardinality | T | Data Type | Description |
| --- | --- | --- | --- | --- |
| SGOwner | 1 | A | string | service group owner of personal network entity identification |

Please note that the abovementioned steps including suggested steps can be realized by means that could be hardware, firmware known as a combination of a hardware device and computer instructions and data that reside as read-only software on the hardware device, or an electronic system. Examples of hardware may include analog, digital and mixed circuits known as microcircuit, microchip, or silicon chip. Examples of the electronic system can include system on chip (SOC), system in package (Sip), computer on module (COM), and the communication device 20. The program code 214 and the processing result related to the process procedure are utilized for handling ownership transfer in the wireless communication system 10.

To sum up, the example of the present disclosure notifies the personal network gateway and the personal network entity of the service ownership transfer through sending a new service group owner change notification message or adding a service group ownership element in the original service group member change notification message.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling ownership transfer in owner transfer procedure in a wireless communication system comprising a server, at least one personal network gateway and at least one personal network entity, the method comprising:
    sending an owner change notification message from the server to the at least one personal network gateway; and
    sending the owner change notification message from the at least one personal network gateway to the at least one personal network entity;
    wherein the owner change notification message comprises a service group owner element and a service group identification element;
    wherein the service group owner element indicates a personal network entity identification of a personal network entity having an ownership.

2. The method of claim 1, wherein the wireless communication system is an open mobile alliance (OMA) wireless communication system.

3. The method of claim 1, wherein the service group identification element indicates a service group identification of a personal network entity having an ownership.

4. A method of ownership transfer, for an owner transfer procedure in a wireless communication system, comprising:
    including a service group owner element in a service group member change notification message;
    wherein the service group owner element indicates a personal network entity identification of a personal network entity having an ownership.

5. The method of claim 4, wherein the wireless communication system is an open mobile alliance (OMA) wireless communication system.

6. A wireless communication system comprising:
    at least one personal network entity;
    at least one personal network gateway, respectively coupled to the at least one personal network entity, for sending a message to the at least one personal network entity; and
    a server, coupled to the at least one personal network gateway, for sending the owner change notification message to the at least one personal network gateway;
    wherein the message is a service group member change notification message or a service group owner change notification message;
    wherein the service group owner element indicates a personal network entity identification of a personal network entity having an ownership.

7. The wireless communication system of claim 6, wherein the wireless communication system is an open mobile alliance (OMA) wireless communication system.

8. The wireless communication system of claim 6, wherein the message comprises a service group owner element and a service group identification element.

9. The wireless communication system of claim 6, wherein the service group identification element indicates a service group identification of a personal network entity having an ownership.

10. A communication device, for handling ownership transfer in an owner transfer procedure in a wireless communication system, the communication device comprising:
    a storage entity, for storing a program code corresponding to a process; and
    a processor, coupled to the storage entity, for processing the program code to execute the process;
    wherein the process comprises sending or receiving an owner change notification message;

wherein the owner change notification message comprises a service group ownership element and a service group identification element;

wherein the service group owner element indicates a personal network entity identification of a personal network entity having an ownership.

11. The communication device of claim 10, wherein the wireless communication system is an open mobile alliance (OMA) wireless communication system.

12. The communication device of claim 10, wherein the service group identification element indicates a service group identification of a personal network entity having an ownership.

13. The communication device of claim 10, wherein the communication device is a server, a personal network gateway or a personal network entity.

14. A communication device, for handling ownership transfer in an owner transfer procedure in a wireless communication system, the communication device comprising:

a storage entity, for storing a program code corresponding to a process; and a processor, coupled to the storage entity, for processing the program code to execute the process;

wherein the process comprises including a service group owner element in a service group member change notification message;

wherein the service group owner element indicates a personal network entity identification of a personal network entity having an ownership.

15. The communication device of claim 14, wherein the wireless communication system is an open mobile alliance (OMA) wireless communication system.

16. The communication device of claim 14, wherein the message is a service group member change notification message or a service group owner change notification message.

* * * * *